United States Patent
Scheuring

(10) Patent No.: US 11,785,888 B2
(45) Date of Patent: Oct. 17, 2023

(54) COMBINE LOOSE SOIL DETECTION SENSOR

(71) Applicant: CNH Industrial America LLC, New Holland, PA (US)

(72) Inventor: Brian L. Scheuring, Sinking Spring, PA (US)

(73) Assignee: CNH Industrial America LLC, New Holland, PA (US)

( * ) Notice: Subject to any disclaimer, the term of this patent is extended or adjusted under 35 U.S.C. 154(b) by 557 days.

(21) Appl. No.: 16/990,134

(22) Filed: Aug. 11, 2020

(65) Prior Publication Data

US 2022/0046853 A1 Feb. 17, 2022

(51) Int. Cl.
| | |
|---|---|
| *A01D 41/127* | (2006.01) |
| *A01D 75/18* | (2006.01) |
| *B60Q 9/00* | (2006.01) |
| *G01D 5/165* | (2006.01) |

(52) U.S. Cl.
CPC .......... *A01D 41/127* (2013.01); *A01D 75/18* (2013.01); *B60Q 9/00* (2013.01); *G01D 5/165* (2013.01)

(58) Field of Classification Search
CPC ......... A01C 7/205; A01C 7/203; A01C 5/064; A01B 49/06; A01B 79/005; A01B 63/1115; A01B 63/24; A01B 63/28; A01B 63/008; A01B 71/02; A01B 63/114; A01B 61/048; A01B 61/044; A01D 41/127; A01D 75/18; B60Q 9/00
See application file for complete search history.

(56) References Cited

U.S. PATENT DOCUMENTS

| | | | |
|---|---|---|---|
| 3,331,249 A | 7/1967 | Boxrud | |
| 5,709,271 A * | 1/1998 | Bassett | A01C 7/205 |
| | | | 172/4 |
| 6,389,999 B1 | 5/2002 | Duello | |
| 7,493,803 B2 | 2/2009 | Kelleher et al. | |
| 8,939,095 B2 | 1/2015 | Freed | |
| 9,043,952 B2 | 6/2015 | Sandin et al. | |
| 9,107,337 B2 | 8/2015 | Bassett | |
| 9,169,605 B2 | 10/2015 | Corcoran et al. | |
| 9,511,633 B2 | 12/2016 | Anderson et al. | |
| 9,645,071 B2 | 5/2017 | Pistrol et al. | |

(Continued)

FOREIGN PATENT DOCUMENTS

| | | |
|---|---|---|
| CN | 202119772 U | 1/2012 |
| CN | 204156900 U | 2/2015 |

(Continued)

OTHER PUBLICATIONS

Design and Validation of an On-The-Go Soil Strength Profile Sensor.

(Continued)

*Primary Examiner* — William J Carter
(74) *Attorney, Agent, or Firm* — Peter Zacharias

(57) ABSTRACT

An exemplary embodiment of the present invention is directed to an apparatus for detecting loose soil having an arm with a first end and a second end. A detector wheel is engaged with the second end of the arm. A spring is configured to bias the arm or the detector wheel in a first direction. An alarm is configured to emit a signal when the movement of the arm or the detector wheel in the first direction exceeds a predetermined threshold.

18 Claims, 2 Drawing Sheets

(56) References Cited

U.S. PATENT DOCUMENTS

| | | |
|---|---|---|
| 10,018,611 B2 | 7/2018 | Stromsoe |
| 2012/0107045 A1* | 5/2012 | DeClerk ............... E02D 3/039 |
| | | 404/117 |
| 2013/0032362 A1 | 2/2013 | Rylander |
| 2015/0033692 A1 | 2/2015 | Schroeder et al. |
| 2018/0002882 A1 | 1/2018 | Stromsoe |
| 2018/0092293 A1* | 4/2018 | Rhodes ............... A01C 7/203 |
| 2018/0317380 A1 | 11/2018 | Bassett |
| 2021/0105931 A1* | 4/2021 | Anderson, Jr. ...... A01B 79/005 |

FOREIGN PATENT DOCUMENTS

| | | |
|---|---|---|
| CN | 204788978 U | 11/2015 |
| CN | 205617349 U | 10/2016 |
| DE | 4242109 A1 | 6/1994 |
| JP | 2004097076 A | 4/2004 |
| WO | 20180189407 A1 | 10/2018 |

OTHER PUBLICATIONS

Soil Compaction Sensor for Site-Specific Tillage: Design and Assessment.

* cited by examiner

COMBINE LOOSE SOIL DETECTION SENSOR

FIELD OF THE INVENTION

The present invention pertains to a sensor for detecting loose soil and, more specifically, to a sensor mounted to the header of a piece of farm equipment, such as a combine harvester, capable of detecting loose soil conditions prior to the entry of the farm equipment into the area of loose soil.

BACKGROUND OF THE INVENTION

Large pieces of farm equipment, such as mobile combines, combine harvesters, and tractors, typically are not provided with means for detecting the quality of soil in the fields in which they are used, which in turn leaves the operator of the equipment unaware of the condition of the soil on which the farm equipment will be driven. In some cases, this can result in the operator driving the equipment into an area of loose or muddy soil, which can cause the farm equipment to become stuck or potentially damage the vehicle or its attachments. Because farm equipment has significantly grown over the years, stuck equipment can take hours or days to free, resulting in significant downtime and repairs to damaged equipment are both expensive based on the capital costs to replace or repair the equipment and downtime lost when the equipment is not in operation. A need, therefore, has risen to detect unsuitable soil conditions prior to entry into the soil by the farm equipment, so as to avoid the equipment becoming stuck and inoperable for periods of hours or days. An exemplary embodiment of the present invention addresses the shortcomings of prior art equipment and facilitates detection of loose soil before wheels of the equipment come into contact with the loose soil.

SUMMARY OF THE INVENTION

An exemplary embodiment of the present invention is directed to an apparatus for detecting loose soil having an arm with a first end and a second end, a wheel engaged with the second end of the arm, a spring configured to bias the arm or the wheel in a first direction, and an alarm configured to emit a signal when the movement of the arm or the wheel in the first direction exceeds a predetermined threshold.

A second exemplary embodiment of the present invention is directed to an agricultural harvester having harvester wheels, a header mounted to a front of the agricultural harvester, a hinge mounted to the header, an arm having a first end and a second end. The first end is pivotably mounted to the hinge. A wheel is engaged with the second end of the arm such that the wheel is positioned at a lag distance from a front harvester wheel of the harvester wheels. A spring is configured to bias the arm and/or the wheel in a first direction. An alarm is configured to emit a signal when the movement of one of the arm and the wheel in the first direction exceeds a predetermined threshold.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
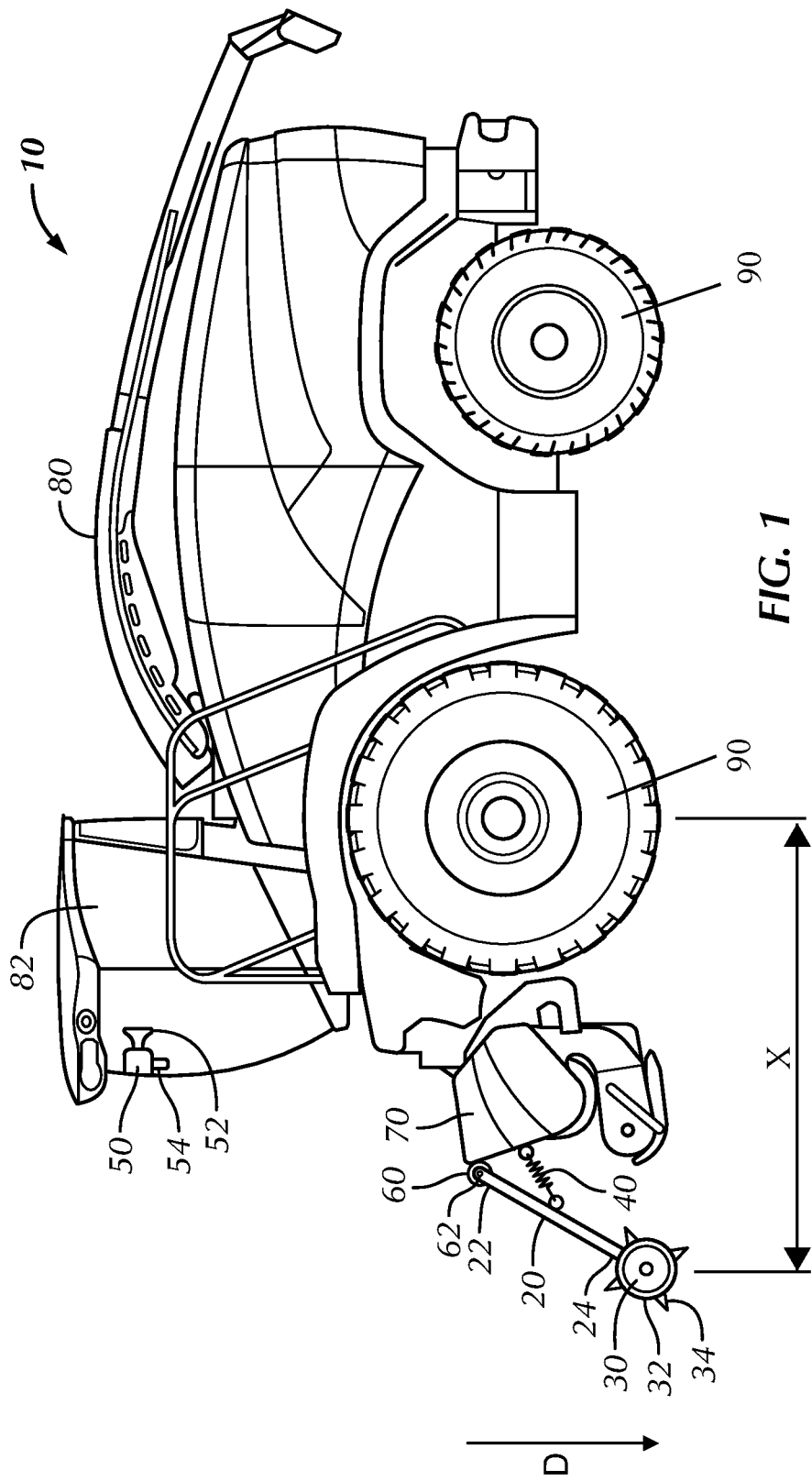
FIG. 1 illustrates a side elevational view of an exemplary embodiment of a piece of farm equipment having a loose soil detection apparatus in accordance with an exemplary embodiment of the present invention, the equipment comprising a mobile combine or combine harvester having a header, and the loose soil detection apparatus, in accordance with the exemplary embodiment of the present invention.

Certain terminology is used in the following description for convenience only and is not limiting. Unless specifically set forth herein, the terms "a," "an" and "the" are not limited to one element but instead should be read as meaning "at least one". The words "right," "left," "lower," and "upper" designate directions in the drawings to which reference is made. The words "inwardly" or "distally" and "outwardly" or "proximally" refer to directions toward and away from, respectively, the geometric center or orientation of the loose soil detection system and related parts thereof. The terminology includes the above-listed words, derivatives thereof and words of similar import.

It should also be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally the same or similar, as would be understood by one having ordinary skill in the art. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to FIG. 1, a first exemplary embodiment of the present invention relates to a loose soil detection system 10, preferably having an arm 20 with a first end 22 and a second end 24. The arm 20 is preferably mounted to a front of a vehicle 80, preferably a combine 80, that has vehicle wheels 90. The system 10 also preferably has a detector wheel 30 rotatably engaged with the second end 24 of the arm 24. The wheel 30 of the first exemplary embodiment is preferably constructed such that its outer surface 32 contains one or more protrusions 34, such as studs, pins, or spikes, but is not so limited. The wheel 30, for example, may have an outer surface 32 that is smooth, treaded, or has other constructions suitable for use in the system 10, based on the present disclosure. The wheel 30 is preferably designed and configured to roll along the ground over which the vehicle 80 is travelling in front of the vehicle 80 and at a lag distance X from a front vehicle wheel 90. The lag distance X provides lag time between detection of loose soil and a time when the front wheel 90 encounters the loose soil, as is described in greater detail below.

In the preferred embodiment, the loose soil detection system 10 is utilized with the combine 80, which has a header 70 mounted to a front portion. The header 70 is designed and configured to remove the crop from a field and a feeder transports the crop into a threshing rotor in the combine 80. The harvested and processed crop is unloaded from the combine through an unloading conveyor for storage and consumption. The loose soil detection system 10 is preferably mounted to the header 70 in front of the wheels 90 and each combine 80 may include multiple loose soil detection systems 20 positioned along the width of the header 70, such as generally in-line with the wheels 90, generally positioned at the middle of the header 70, at extreme outside edges of the header 70 or extending from other areas of the header, such as at a rearward side of the header 70 to avoid contact between the unharvested crop and the detector wheel 30.

The system 10 further preferably has a spring or other resilient member 40 configured to bias the arm 20 or detector wheel 30 in a first direction, represented in FIG. 1 with the downward arrow marked with reference character "D." The spring 40 is preferably configured to bias both the arm 20 and detector wheel 30 in a downward direction so that the wheel 30 is pressed against the ground, but may alternately be configured so that the spring 40 biases only the arm 20 or only the wheel 30, such as the arm may be fixed (not shown) relatively to the combine 80 and the detector wheel 30 being movable relative to the arm 20, preferably toward and away from the ground. The system 10 further preferably includes an alarm 50 configured to emit a signal when the movement of the arm 20 or the detector wheel 30 in the first direction D exceeds a predetermined threshold. In this manner, the alarm 50 emits the signal when the detector wheel 30 encounters ground of a sufficient softness that the detector wheel 30 at least partially sinks into the ground and, therefore, extends further in the direction D than the predetermined threshold. The protrusions 34 are preferably configured to allow the loose soil detection system 10 to be more sensitive to changes in soil hardness, as the protrusions 34 are preferably configured to more easily penetrate the soil or ground than would the detector wheel 30 without the protrusions 34. In this manner, the penetration of the soil by the protrusion 34 would cause the arm 20 and/or the detector wheel 30 to move in the direction D and thus trigger the alarm 50 if the soil is sufficiently soft or loose.

The first exemplary embodiment also preferably contains a hinge 60 engaged with the first end 22 of the arm 20. The hinge 60 preferably also includes or is connected to a potentiometer 62. In use, the potentiometer 62 can measure the amount of rotation or deflection present in the hinge 60, and in that fashion may measure the amount of movement in the arm 20 and/or the wheel 30 in the direction D. The potentiometer 62 is not limited to being positioned within or directly connected to the hinge 60, but instead may be located anywhere within the system 10 that is suitable for monitoring the amount of rotation or deflection in the hinge 60. In addition, the deflection or movement of the detector wheel 30 is not limited to being monitored or being measured by the potentiometer 62 and may be otherwise monitored or measured by a visual detection mechanism, a displacement measurement sensor or other sensors or mechanisms that are able to detect the movement of the wheel 30 into or toward the ground over which the vehicle 80, preferably the combine 80, is traversing.

The hinge 60 is also preferably mounted on the front of the header 70 of the vehicle 80, preferably a combine harvester or agricultural harvester, which at least partially spaces the detector wheel 30 from the vehicle front wheel 90 at the lag distance X. When mounted on the header 70, the arm 20 preferably extends forward from the header 70, as shown in FIG. 1, but is not so limited. Even more preferably, the header 70 is mounted to the front of the combine 80 such that the arm 20 and detector wheel 30 are generally longitudinally aligned with the front wheel 90. The vehicle 80 is preferably a combine harvester, but is not so limited, and may instead be a tractor, other farm equipment, or any other type of vehicle for which advance monitoring of ground conditions is desired. When the system 10 is mounted to the combine 80, the alarm 50 may also be configured to shut down the vehicle 80 or an engine of the vehicle 80 when the detector wheel 30 encounters ground of a sufficient softness that the detector wheel 30 at least partially sinks into the ground and, therefore, extends further in the direction D than the predetermined threshold. The combine 80 may also include a central processor that collects the data from the potentiometer 60 or other sensor and automatically sends a warning signal to the operator, limits the forward travel speed of the combine 80, stops forward movement of the combine 80, slows or stops the combine 80 after travel less than the lag distance X or otherwise functions to limit the chance that the front wheels 90 enter loose soil, as detected by the loose soil detection system 10.

Figure 2:
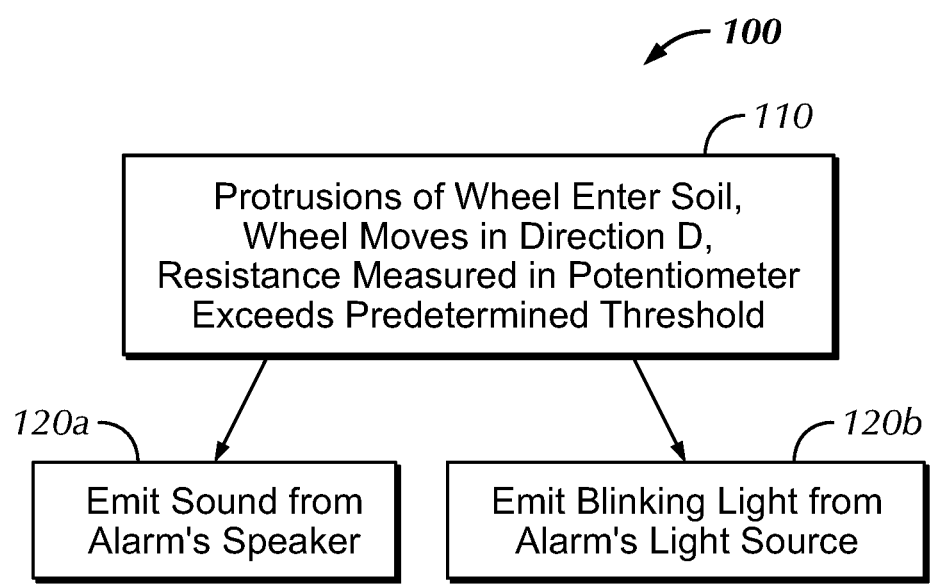
FIG. 2 illustrates a method of using the exemplary embodiment of FIG. 1.

Referring now to FIG. 2, an exemplary method 100 of the function of the alarm 50 is shown. The alarm 50 may be configured in any way to emit any type of signal suitable for notifying an operator of the system 10 on the combine 80 that the detector wheel 30 and/or arm 20 have deflected a sufficient amount in the direction D to indicate that loose soil is detected. In this exemplary method, at step 110, the protrusions 34 of the detector wheel 30 encounter loose soil and penetrate that soil, allowing the detector wheel 30 to move further in the direction D (toward the ground), crossing the predetermined alarm threshold. At step 120a, the alarm 50 causes an alarm sound to be emitted from a speaker 52 mounted within the operator's cabin 82 of the combine 80, preferably before the front wheels 90 contact the detected loose soil. At step 120b, the alarm 50 also causes a visual indication, in this example a blinking light, to be emitted from a light source 54 mounted within the operator's cabin 82. The light source 54 may be of any suitable type, such as an LED or an incandescent light bulb. In both step 120a and 120b, the operator can preferably detect the alarm and alter the course or speed of the vehicle 80 so that it does not become stuck in the loose soil. The alarm 50 preferably sounds or presents the indication to the driver that loose soil is detected in advance of the front wheel 90 coming into contact with the loose soil based on the lag distance X. The controller may also automatically prevent the combine 80 from moving forward into the area of detected loose soil, may slow the combine 80 following detection of loose soil or may otherwise modify the operation of the combine 80 to limit potential exposure of the combine 80 to the detected loose soil.

The loose soil detection system 10 may also be utilized in combination with other sensors and mechanisms that are able to detect loose soil proximate the combine 80 before the vehicle wheels 90, typically the front wheels 90, encounter the loose soil. The loose soil detection system 10, for example, may include a moisture sensor positioned at or near the detector wheel 30 that is able to detect moisture on or in the ground. The alarm 50 may include a central processor or central controller that is able to calculate the potential for loose soil by comparing the deflection of the detector wheel 30 and the moisture level of the soil with predetermined norms. The alarm 50 may provide a warning to the user when the combination of deflection of the detector wheel 30 and moisture level of the soil reach predetermined limits stored in the central processor. In addition, other sensors may be utilized, such as soil detection sensors mounted on sides of the detector wheel 30 or the vehicle wheels 90 that detect soil contacting sides of the detector wheel 30 or the vehicle wheels 90 that indicate the detector wheel 30 or vehicle wheels 90 are sinking into the soil. The central processor or controller may otherwise provide warnings or automatically take actions when these loose soil conditions are detected, such as by releasing pressure from the wheels 90 to provide additional traction capability to the wheels 90.

In the first exemplary embodiment, the alarm 50 includes a central processor or server that collects or acquires data from the potentiometer 60 or any other sensors associated with the loose soil detection system 10, such as a moisture sensor, visual sensor, displacement sensor or other related sensor. The central processor receives data from the potentiometer 60 at predetermined intervals and compares the received data during each interval to the predetermined threshold. When the received data exceeds the predetermined threshold, the alarm 50 may provide the warning or the central processor may be configured to only provide the warning after a series of comparisons of the received data and the predetermined threshold are consecutively exceeded or show movement of the detector wheel 30 beyond the predetermined threshold. The consecutive series of exceeded thresholds may be utilized to limit false warnings to the users based on temporary electronic failures or surges, sudden and extreme temporary movement of the detector wheel 30 or other conditions that may result in false alarms. The central processor may also utilize calculations of combined acquired data, such as movement of the detector wheel 30 in combination with soil moisture levels, as well as the speed of the combine 80 for comparison to a combined predetermined threshold. The potentiometer 60 or other sensors may communicate with the central processor via a wired or wireless communication protocol for transmitting sensed measurements or data from the potentiometer 60 or other sensors to the central processor, which is preferably comprised of a portion of the alarm 50.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An apparatus for detecting loose soil in front of a vehicle having vehicle wheels, the apparatus comprising:
   an arm having a first end and a second end, the first end connected to the vehicle;
   a detector wheel engaged with the second end of the arm;
   a spring configured to bias the arm and the detector wheel in a first direction; and
   an alarm configured to:
      emit a signal when the movement of one of the arm and the detector wheel in the first direction exceeds a predetermined threshold; and
      shut down the vehicle when the movement of one of the arm and the detector wheel in the first direction exceeds the predetermined threshold.

2. The apparatus of claim 1, further comprising:
   a hinge engaged with the first end of the arm and a header of the vehicle on which the hinge is mounted, the hinge configured to pivotably mount the arm to the vehicle.

3. The apparatus of claim 2, wherein the vehicle is comprised of a combine harvester.

4. The apparatus of claim 3, wherein the header is mounted to a front portion of the combine harvester such that the detector wheel is positioned at a lag distance from a front vehicle wheel of the vehicle wheels.

5. The apparatus of claim 1, wherein the arm extends forwardly from the vehicle and from vehicle wheels of the vehicle wheels.

6. The apparatus of claim 1, wherein the detector wheel includes protrusions.

7. The apparatus of claim 6, wherein the protrusions are comprised of one of studs and pins.

8. The apparatus of claim 1, wherein the signal is an audible sound.

9. The apparatus of claim 8, wherein the sound is emitted within an operator's cabin of the vehicle, the alarm including a speaker mounted in the operator's cabin.

10. The apparatus of claim 1, wherein alarm includes a light source and the signal is an optical indication.

11. The apparatus of claim 10, wherein the optical indication is a blinking light, the light source being mounted within an operator's cabin of the vehicle.

12. The apparatus of claim 1, further comprising:
    a potentiometer mounted proximate the first end, the potentiometer designed and configured to determine the amount of movement of the arm and the detector wheel in the first direction for comparison to the predetermined threshold.

13. An agricultural harvester having harvester wheels, the agricultural harvester comprising:
    a header mounted to a front of the agricultural harvester, the header configured to remove a crop from a field;
    a hinge mounted to the header;
    an arm having a first end and a second end, the first end pivotably mounted to the hinge;
    a detector wheel engaged with the second end of the arm such that the detector wheel is positioned at a lag distance from a front harvester wheel of the harvester wheels;
    a spring configured to bias the arm and the detector wheel in a first direction; and
    an alarm configured to:
       emit a signal when the movement of one of the arm and the wheel in the first direction exceeds a predetermined threshold; and
       shut down the vehicle when the movement of one of the arm and the detector wheel in the first direction exceeds the predetermined threshold.

14. The agricultural harvester of claim 13, wherein the detector wheel includes protrusions.

15. The agricultural harvester of claim 14, wherein the protrusions are comprised of one of studs and pins.

16. The agricultural harvester of claim 13, wherein the signal is an audible sound emitted within an operator's cabin of the agricultural harvester, the alarm including a speaker mounted in the operator's cabin.

17. The agricultural harvester of claim 13, wherein the alarm includes a light source mounted within an operator's cabin of the agricultural harvester and the signal is a blinking light.

18. The agricultural harvester of claim 13, further comprising:
    a potentiometer mounted proximate the first end of the arm, the potentiometer designed and configured to determine the amount of movement of the arm or the wheel in the first direction for comparison to the predetermined threshold.

* * * * *